Sept. 24, 1935.  E. M. BROGDEN ET AL  2,015,512
APPARATUS FOR WASHING OR TREATING FRUIT AND THE LIKE
Filed June 13, 1932   2 Sheets-Sheet 1
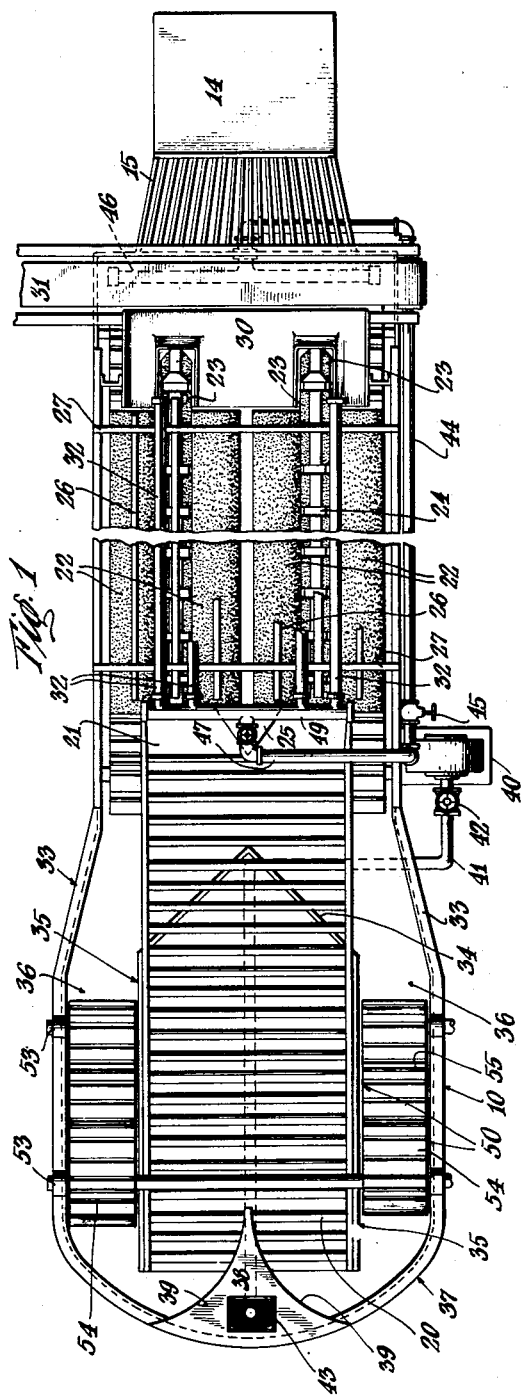
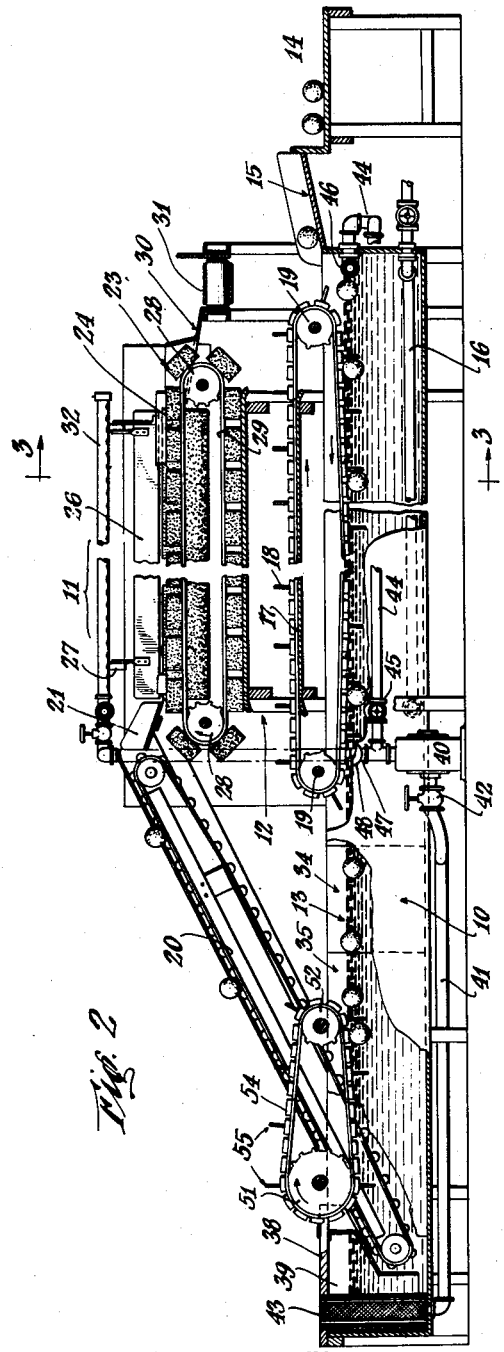
INVENTORS
Ernest M. Brogden
Ronald R. Brogden
BY
Steward & McKay
ATTORNEYS

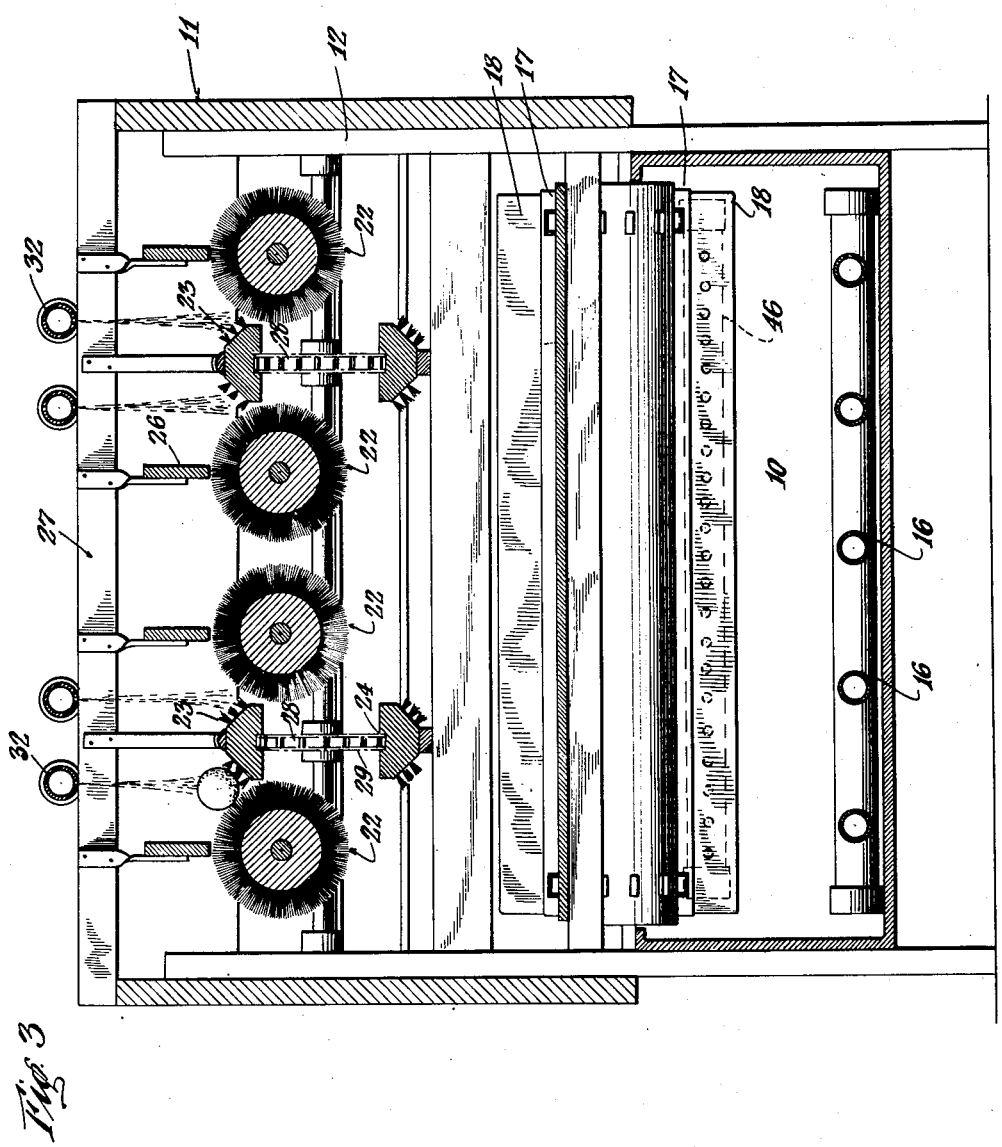

Patented Sept. 24, 1935

2,015,512

UNITED STATES PATENT OFFICE 2,015,512

APPARATUS FOR WASHING OR TREATING FRUIT AND THE LIKE

Ernest M. Brogden and Ronald R. Brogden, Pomona, Calif., assignors to Brogdex Company, Winter Haven, Fla., a corporation of Florida Application June 13, 1932, Serial No. 616,974

7 Claims. (Cl. 146—202)

This invention relates to apparatus for washing or treating fruit and the like. The invention more particularly pertains to apparatus of the type employing a soaking tank and a washer, as associated apparatus units, for treating fresh citrus fruit, and other fruits or vegetables adapted to the same general mode of handling, to prepare the same for market in sound and clean condition.

Because of the large-capacity soaking tank and washer needed for the handling of citrus fruits and the like on the commercial scale required in packing house operations, these apparatus units, as heretofore mounted independently of each other on the packing house floor, take up considerable floor space which would to great advantage be reduced to the space required for the larger unit (e. g. the soaking tank) alone, if the washer could be mounted above it and the arrangement made effective for the work required of both units.

Prior attempts to make such a mounting practically effective for the work required of the two units have been unsuccessful, however, because of the difficulty in arranging for the automatic delivery of the fruit from the soaking tank to the washer above it. With these two units independently mounted, all that is needed to automatically deliver the fruit from the soaking tank to the washer, or to a conveyor leading thereto if the second unit is so spaced from the first as to require a conveyor, is a fruit elevator of the common endless type with its receiving or intake end dipping into the discharge end of the soaking tank and its ascending run extending outwardly of the tank. In such an arrangement the front or intake face of the elevator is disposed in the direct line of travel of the fruit toward the discharge end of the tank so that the fruit freely floats to conveying position on the elevator. But with the washer mounted directly above the soaking tank, the elevator must be so disposed at an inward and upward slope from the discharge end of the tank to the receiving end of the washer as to present its rear instead of its front or intake face in the direct line of travel of the fruit toward the discharge end of the tank. This creates the problem of getting the fruit around the submerged end of the elevator to its intake in such manner as to avoid accumulation of fruit behind the elevator and in adjacent parts of the tank, which would clog up the apparatus and seriously interfere with its operation. In the case of citrus fruits in particular that problem is an especially difficult one because such fruit must be gently handled by the apparatus parts in order to avoid mechanical injury thereto. A general object of the invention is to solve that problem.

For the solution of that problem the present invention provides fruit-deflecting means in the discharge-end portion of the soaking tank so arranged as gently to divert the oncoming stream of fruit to one or more channels of travel around the submerged end of the elevator to the intake at its front or ascending face. In its most effective form the invention also includes mechanical means operating on the fruit in its diverted channel in a manner positively to advance the fruit therethrough and to facilitate its final advance to the elevator intake.

Other objects and the novel features and advantages of the invention will become further apparent from the following description, taken in conjunction with the accompanying drawings, of one practical form of apparatus embodying the invention. It is to be understood, however, that the specific form of apparatus here shown and described is merely illustrative and that the invention may be embodied in other forms of apparatus.

In the drawings:

Fig. 1 is a top plan view of apparatus embodying the invention;

Fig. 2 is a side elevational view of the apparatus shown in Fig. 1, with the immediate side wall partially broken away to expose interior parts to view, and with some of those parts in vertical longitudinal section; and Fig. 3 is a transverse vertical sectional view of the apparatus on the line 3—3 of Fig. 2, looking in the direction of the arrows, and on an enlarged scale.

Although adapted for the handling of other fruit also, the particular form of apparatus shown in the drawings is one which has been found in practice to be especially useful in the handling of oranges and lemons; and for the sake of brevity of description, wherever specific reference is made to the fruit handled by the apparatus, lemons will be taken as typical.

The apparatus shown in the drawings comprises a soaking tank, indicated generally by 10, and a washer of well known type, indicated generally by 11, the latter and shorter unit being mounted directly above the soaking tank upon extensions of the side standards 12 of the tank, as shown.

The soaking tank may be of the usual form and dimensions except for the discharge-end portion around and beneath the elevator which departs from prior practice to conform to the principles of the present invention. The soaking tank of the apparatus shown is, in general, the customary open-topped receptacle of uniform depth and greater length than width, with flat bottom and vertical side and end walls as shown. The tank is normally supplied with the desired treating liquid by any suitable means, not shown, up to the level indicated at 13; and the fruit to be treated is delivered in quantity from the supply dump 14 over the inclined grating 15 into the receiving end of the tank, at the right in Fig. 2. The tank may be provided with a steam coil 16, or other suitable means, for heating the treating liquid, as is sometimes desirable.

That portion of the soaking tank entirely to the rear of the elevator may be provided with some form of mechanical means operating on the fruit to advance the same. The means here shown is a fruit-submerging and advancing mechanism comprising an elongated belt of wooden slats 17 provided with spaced paddles 18. The side chains of the belt are trained around driving sprockets 19 journaled in side frames of the tank so as to dispose the lower run of the slats between the sprockets in floating position in the body of the treating liquid and to drive the belt in the direction indicated by the arrows on Fig. 2 to cause the paddles to engage and submerge the pieces of fruit at the receiving end of the tank and advance them in submerged engagement with the slats of the belt through the body of the liquid.

The washer unit of the apparatus may comprise any suitable type and specific form of washer adapted to be mounted above the soaking tank. The particular washer used in the illustrative apparatus employs the brush rolls and brush-block conveyor between the rolls shown in the Brogden Patent No. 1,786,405, granted December 23, 1930. In the present apparatus, this brush washer is mounted over the soaking tank with its receiving end (at the left in the views of the drawings) spaced inwardly of the discharge end of the tank to accommodate the fruit elevator between the two, and with the washer therefor arranged to handle fruit in a direction of travel opposite to that of fruit passing through the tank.

A fruit elevator of the common roller belt type, indicated at 20 in the drawings, is employed to deliver the fruit from the discharge end of the soaking tank to the washer above the tank. As shown, the lower end of the elevator dips beneath the liquid level in the tank and its upper end is positioned to deliver the fruit from the front or working face of the elevator on to the chute board 21. The fruit then rolls over the chute board into the brush runways of the washer provided by the opposed surfaces of the rotary brush rolls 22 and the inverted V-shaped brush blocks 23 of the endless brush-block conveyors 24. A guide plate 25 on the chute board and guide rails 26 supported from the upper cross members 27 of the apparatus and extending longitudinally of the brush rolls serve to properly distribute the fruit to the brush runways of the washer. The brush-block conveyors 24 are so driven by the sprockets 28, over which the chains 29 of the conveyors are trained, as to advance the fruit along those runways to the discharge end of the washer (at the right in Figs. 1 and 2 of the drawings). The brush-block conveyors are here only conventionally shown, and it will be understood, of course, that the conveyors are provided between the blocks with pusher elements to engage the fruit to advance it through the runways or the brush sides of the blocks may be suitably ribbed to assist the forward feeding movement of the fruit. The fruit discharged from the runways of the washer is delivered by the chute board 30 to the conveyor belt 31 by which the fruit is then conveyed to other parts of the packing house for such further handling as may be required in preparing it for market.

The washer is provided with perforated pipes 32, disposed, as shown more particularly in Figs. 2 and 3, over the brush runways to drench the fruit with the washing or treating liquid throughout the advance of the fruit along those runways. These pipes may be supplied from any suitable source but are preferably supplied with the liquid from the soaking tank itself in the manner hereinafter described.

As shown, the mounting of the washer directly above the soaking tank necessarily disposes the lower portion of the descending run of the elevator directly in the path of advance of the fruit from the receiving end toward the discharge end of that tank. Therefore, unless means are provided, as the invention contemplates, for directing and guiding the fruit in the tank out from behind and around the submerged portion of the elevator to its front or ascending face and for securing a steady advancing movement of the fruit in its diverted path, the fruit tends to accumulate behind the elevator and in adjacent parts of the tank to an extent so clogging the apparatus as to seriously interfere with its operation.

In the illustrative apparatus the means for directing and guiding the fruit in the tank out from behind and around the submerged portion of the elevator to its front or ascending face are provided by certain modifications in the dimensions of the tank and contour of its boundary walls in that portion of the tank over which the elevator extends and deflector elements within those boundary walls.

That portion of the soaking tank over which the elevator extends is made of greater width than the remaining portion of the tank to the rear of the elevator, the side walls of the tank flaring outwardly, as indicated at 33 in Fig. 1, from the rear to the forward widened portion. Centrally disposed in the tank in the region of its flare and beneath the elevator is a deflector member having vertical walls 34 converging in the direction of the receiving end of the tank to form a deflector face of V-shape in plan; and joined to this deflector face so as to extend forwardly therefrom toward the discharge end of the tank are vertically disposed side walls 35 forming with the opposed side walls of the tank two channels 36 on opposite sides of the elevator. By this arrangement, fruit-diverting channels are formed, extending around the submerged end of the elevator from the portion of the soaking tank behind the elevator to the portion in front of and adjacent the elevator intake. Thus, the V-shaped face of the deflector functions to divide the advancing fruit into two streams and to direct them into those channels.

To further properly direct the fruit to the elevator intake, the end wall 37 of the soaking tank is curved about the submerged end of the elevator with the curvature beginning in the region of the discharge ends of the side channels 36, and immediately in front of the elevator intake that wall is provided, interiorly of the tank, with a guide member 38 to direct the fruit finally to the intake and ascending face of the elevator, the guide member having inwardly curving side walls 39 meeting in a tongue portion over the ascending face of the elevator. It is particularly to be noted that the end wall 37 of the tank and the side walls of the final guide member 38 form a smooth unbroken surface of gentle curvature extending from the delivery ends of the side channels 36 to a point well up the ascending face of the elevator, for the flow of the fruit therealong from the delivery ends of those channels to conveying position on the elevator. It is also to be noted that the guide member 38 keeps the two opposing streams from the side channels 36 separate until the fruit has completed reversing its original direction of travel and is all headed for the elevator intake.

Since the mechanism employed in the receiving-end portion of the tank to advance the fruit is necessarily restricted to a zone of action rearwardly of the fruit-deflector and the side channels leading therefrom about the submerged end of the elevator, that mechanism cannot function in a manner positively to advance the fruit through or even into those channels. While some further forward impetus is imparted to the fruit after its discharge from that mechanism by the crowding forward of the oncoming fruit behind it, that cannot be relied upon to give the fruit the steady advancing movement past the deflector face and through the side channels about the submerged end of the elevator to its intake and required to prevent clogging of the apparatus at these points, and other provision must be made to secure the required advance of the fruit.

To that end, means are provided for circulating the tank liquid in a manner to create a steady current flow in the body of liquid in the tank from its fruit-receiving end through the side channels about the submerged end of the elevator to the elevator intake. In the illustrative apparatus, that means comprises a power-driven pump 40, having its intake connected by pipe 41, valved at 42, to a point in the discharge end of the soaking tank immediately opposite the elevator intake, the pipe 42 drawing the liquid from the tank through a suction box or screen 43. The discharge side of the pump is connected by pipe 44, valved at 45, to the perforated header pipe 46 at the fruit-receiving end of the tank, from which header pipe the liquid, withdrawn by the pump from the tank at its fruit-discharge end, is forcibly injected into the body of the liquid in the tank at the fruit-receiving end. By this arrangement, a circulation of the tank liquid is set up, with a steady current flow in the body of liquid in the tank from its fruit-receiving end through the side channels about the submerged end of the elevator to the discharge end of the tank immediately opposite the elevator intake, and then a return flow of the liquid through the outside piping and pump to the receiving end of the tank, in recurring cycles. The resulting current flow is a substantial aid in systematically advancing the fruit and especially in advancing the fruit from the discharge end of the fruit-advancing device in the rear portion of the tank past the deflector face and into the side channels about the submerged end of the elevator and from those channels to the elevator intake. The circulation of the tank liquid has the further desirable effect of maintaining a uniform temperature throughout the liquid in the tank. As already stated, it is desirable in some uses of the apparatus in the treatment of fruit to heat the treating liquid, and in such cases the effect of the circulation in maintaining a uniform temperature throughout the body of liquid in the tank is of considerable practical advantage.

The pump 40, with its pipe connection for withdrawing liquid from the discharge end of the soaking tank, may also be utilized to supply the jet pipes 32 of the washer unit of the apparatus, by connecting the discharge side of the pump through the pipe 47, valved at 48, to the header 49 to which the jet pipes 32 are connected.

In addition to the aid afforded by circulation of the tank liquid in advancing the fruit into and through the side channels about the submerged end of the elevator, it is desirable to provide some mechanical means for more positively advancing the fruit through those channels and thus further avoid possible clogging of the apparatus. Various types of such means may be employed. One which also submerges the fruit while acting upon it is a convenient type, and the fruit-advancing means embodied in the specific form of the invention here illustrated is one of that type. The particular fruit-advancing device, with which each of the two channels 36 is provided in the present instance, is a suitable but not indispensable form of the submerger type, comprising two endless side chains 50, trained around sprockets 51 and 52 which are journaled in bearings 53 on the sides of the tank, an endless series of spaced slats 54 mounted transversely of the run of the chains, and spaced paddles 55 mounted on the slats and projecting outwardly at right angles from their faces. The endless slat belt thus formed has its lower run or working face dipping below the liquid level in the tank and is driven in the direction of the arrows shown in Fig. 2 adjacent sprockets 51 and 52, so that the fruit-engaging paddles submerge and advance the fruit through the liquid in the channels 36 toward the elevator intake. Also, in this particular fruit-advancing device, the forward sprockets 51 are of substantially greater diameter than the rear sprockets 52, and their mounting is such that the lower run of the device is disposed at a downward inclination to the water level from its receiving to its discharge end, thus enabling its receiving end to be disposed, as shown, slightly above the liquid level when the tank is full so as to allow the pieces of fruit more freely to float thereunder.

The forward current through the body of liquid in the tank and the mechanical action of the devices in the side channels about the submerged end of the elevator are together particularly effective in advancing the fruit, as the forward current insures the advance of the fruit from the discharge end of the fruit-advancing mechanism in the rear portion of the tank past the deflector and into the side channels, while the more positive action on the fruit of the devices in the side channels further insures its advance completely through those channels. Those provisions, together with the directing and guiding surfaces within the tank, insure the steady and uninterrupted advance of the fruit about the submerged end of the elevator to its ascending face and prevent clogging of the apparatus anywhere about the elevator where clogging is most apt to occur.

What is claimed is:

1. Apparatus for treating fruit and the like comprising the combination with a soaking tank arranged to receive fruit at one end and to discharge it at the other end, of a washer mounted substantially directly over said tank with its fruit-receiving end facing in the direction of the discharge end of said tank, a sloping elevator of the endless type having its intake in said tank near and facing the discharge end thereof and having its delivery end operatively adjacent the receiving end of said washer, means in said tank to guide fruit in its travel toward the discharge end of said tank to a path of travel out of engagement with said elevator around the same to its intake, and means in said tank to reverse the direction of travel of said fruit after it has cleared said elevator so as to advance the same to the intake of said elevator.

2. Apparatus as set forth in claim 1 and in which said fruit-guiding means comprises a deflector member behind said elevator arranged to deflect fruit laterally from its initial path of travel toward said elevator.

3. Apparatus as set forth in claim 1 and in which said reversing means comprises a guide member between the discharge end of the tank and the elevator intake having a guiding surface curving inwardly from the sides of said tank and toward the elevator intake.

4. Apparatus for treating fruit and the like comprising, in combination, a tank adapted to contain a body of liquid and to receive fruit at one end for passage through said body of liquid and to discharge the fruit at the other end thereof, an elevator of the endless type having its intake in said tank near and facing the discharge end thereof and having an upward slope in the direction of the fruit-receiving end of the tank adapting said elevator to deliver fruit directly above said tank, said elevator being laterally spaced from a side of said tank to permit the passage of fruit in the body of said liquid to one side of the elevator, and deflector means in the tank beneath and behind said elevator to deflect fruit to said one side of the elevator.

5. Apparatus for treating fruit and the like comprising, in combination, a tank adapted to contain a body of liquid and arranged to receive fruit at one end for passage through said body of liquid and to discharge the fruit at the other end thereof, an elevator of the endless type having its intake in said tank near and facing the discharge end thereof and having an upward slope in the direction of the fruit-receiving end of the tank adapting said elevator to deliver fruit directly above said tank, said tank having outer boundary and interior walls cooperatively arranged to form two opposite-side channels for the passage of fruit around said elevator to the intake thereof and deflector means beneath the slope of said elevator for diverting advancing fruit into said channels.

6. Apparatus for treating fruit and the like comprising, in combination, a tank adapted to contain a body of liquid and arranged to receive fruit at one end for passage through said body of liquid and to discharge the fruit at the other end thereof, an elevator of the endless type having its intake in said tank near and facing the discharge end thereof and having an upward slope in the direction of the fruit-receiving end of the tank adapting said elevator to deliver fruit directly above said tank, said elevator being laterally spaced from the sides of said tank, interior wall means cooperating with side walls of said tank to form channels on opposite sides of said elevator, means between the fruit-receiving end of the tank and said elevator for guiding fruit into said channels and means for guiding fruit from said channels to the intake of said elevator.

7. Apparatus as set forth in claim 6 and in which the means for guiding fruit from said channels to the intake of said elevator comprises opposed wall portions of said tank extending in unbroken curves from said channels to the elevator intake.

ERNEST M. BROGDEN.
RONALD R. BROGDEN.